United States Patent Office 2,776,993
Patented Jan. 8, 1957

2,776,993

1-PARAMETHOXYPHENYL-2-CYCLOPENTYL-AMINO-1-PROPANOL COMPOUNDS

Gordon A. Alles, San Marino, Calif.

No Drawing. Application June 9, 1954,
Serial No. 435,600

7 Claims. (Cl. 260—563)

This invention relates to new and useful chemical compounds. The principal object of the invention is to provide new chemical compounds which are useful as medical preparations either alone or together with other substances, or as intermediates in the preparation of medically useful compounds.

The compounds of my present invention comprise 1-paramethoxyphenyl-2-cyclopentylamino-1-propanol compounds of the structural formula

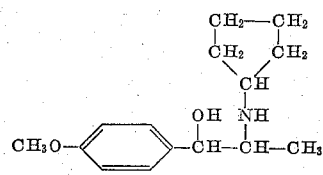

and include 1-paramethoxyphenyl-2-cyclopentylamino-1-propanol in its optically inactive and optically active forms, and their salts with acids. In preparing particular medical preparations the bases or their salts may be conjugated or compounded with other substances.

The physiological effects of the compounds are importantly advantageous and distinct from those of N-alkyl and other N-cycloalkyl derivatives of 1-paramethoxyphenyl-2-amino-1-alkanols that have been studied in that they are effectively administered orally to man and primarily exert their effects upon the circulation by acting upon the mechanisms increasing pulse rate and output of the heart.

It has been found that an optically inactive form of a 1-paramethoxyphenyl-2-cyclopentylamino-1-propanol compound that exhibits marked physiological effectiveness may be prepared by catalytic hydrogenation under particular conditions of the corresponding optically inactive α-cyclopentylamino-paramethoxypropiophenone. It may be possible that other satisfactory methods of synthesis may be found and the following examples are given to indicate only how the intermediate amino-ketone and final amino-alcohol may be prepared and represent no limitations on the methods of preparing the final products.

To a mixture of α-bromo-paramethoxypropiophenone (24.3 grams or 0.10 mole) in 100 milliliters ethanol is added cyclopentylamine (34 grams or 0.40 mole) in a pressure bottle. This mixture is shaken until it becomes homogeneous and is then allowed to stand overnight at room temperatures. The ethanol and excess cyclopentylamine are distilled off and the residue shaken with a mixture of benzene and water. The benzene layer is separated and washed with some water, then acidified with a slight excess of 4 normal hydrochloric acid. The benzene and water are distilled off to yield a yellowish crystalline residue which is then crystallized from ethanol solution by addition of isopropyl ether. The white crystalline product is washed with acetone and air dried. The melting point of such α-cyclopentylamino- paramethoxypropiophenone hydrochloride product ranges from 195–6° up to 199–200° C. in batches pure enough to reduce by catalytic hydrogenation to the corresponding amino-alcohol.

A solution of 17 grams or 0.06 mole of α-cyclopentylamino-paramethoxy-propiophenone hydrochloride is dissolved with 200 milliliters warm water and 3.3 grams of a catalyst of 10% palladium on charcoal activated with 1% platinum is added. This mixture is shaken with hydrogen under 50 pounds per square inch pressure at about 25° C. and the calculated amount of needed hydrogen is absorbed in about 30 minutes. The catalyst is then filtered off and the filtrate evaporated to dryness. The product is dissolved into hot ethanol and isopropyl ether added to yield a crystalline product on cooling. The optically inactive 1-paramethoxyphenyl-2-cyclopentylamino-1-propanol hydrochloride product so obtained melts at about 206–7° C. Such product may be again crystallized from ethanol to a product melting at 209–10° C. These products give analyses closely corresponding to the empiric formula $C_{15}H_{23}NO_2 \cdot HCl$ and are suitable for producing adequate physiological effects in medical preparations.

On adding 2 milliliters of 18 normal sodium hydroxide solution to 5.7 grams or 0.02 mole of 1-paramethoxyphenyl-2-cyclopentylamino-1-propanol hydrochloride dissolved in 50 milliliters water an oil separates which later crystallizes. This resultant base melts at 87–8° C. when washed and air dried. On recrystallizing from ethanol prisms of optically inactive 1-paramethoxyphenyl-2-cyclopentylamino-1-propanol base melting at 88–9° C. are obtained.

Neutralization of a solution of 1-paramethoxyphenyl-2-cyclopentylamino-1-propanol base in 50 percent ethanol-water solution with 4 normal sulfuric acid solution and then evaporation yields crystals of the neutral sulfate salt melting at 237–9° C. By similar procedure, but using an absolute ethanol solution and succinic acid for neutralization there is obtained a nodular crystal crop of 1-paramethoxyphenyl-2-cyclopentylamino-1-propanol neutral succinate which melts on heating at 172–3° C.

By allowing a hot homogeneous mixture of 20 grams or 0.08 mole of the above described optically inactive 1 - paramethoxyphenyl - 2 - cyclopentylamino-1-propanol base with 12 grams or 0.08 mole dextro-tartaric acid and 150 milliliters water to crystallize by cooling there is first obtained a crystal crop of dextro-rotatory 1-paramethoxyphenyl-2-cyclopentylamino-1-propanol dextro-bitartrate monohydrate in almost pure form. This product melts at about 132–4° C. and shows an optical rotation of $[\alpha]_D^{25} + 21.5°$ when dissolved in 6% solution in 1.5 normal ammonium hydroxide solution. Recrystallization of this first crystal crop from water gives a product which softens on heating at 135° C. and melts at 138–140° C. with frothing. This recrystallized product shows an optical rotation of $[\alpha]_D^{25} + 21.7°$ when dissolved in 6% solution in 1.5 normal ammonium hydroxide solution. Liberation of the base from this dextro-rotatory dextro-bitartrate monohydrate gives a levo-rotatory 1-paramethoxyphenyl-2-cyclopentylamino-1-propanol base which melts at 105–6° and shows an optical rotation of $[\alpha]_D^{22} - 19.3°$ when dissolved in 3% solution in ethanol.

The filtrate from the first separation of dextro-rotatory 1 - paramethoxyphenyl - 2 - cyclopentylamino-1-propanol dextro-bitartrate monohydrate as described in the preceding paragraph is made alkaline with sodium hydroxide to precipitate a dextro-rotatory 1-paramethoxyphenyl-2-cyclopentylamino-1-propanol base that is more than 90% pure dextro-rotatory base. By dissolving this with two molecular weight equivalents of racemic tartaric acid in a hot concentrated solution in water and then cooling there is obtained a crystal crop. Recrystallization of these crystals from water yields a product which melts at 138–40° C. with frothing. This product is levo-rotatory 1-paramethoxyphenyl -2- cyclopentylamino - 1 - propanol levo-bitartrate monohydrate and shows an optical rotation of $[\alpha]_D^{23}$ —21.8° when dissolved in 6% solution in 1.5 normal ammonium hydroxide. Liberation of the base from this compound gives a dextro-rotatory 1-paramethoxyphenyl- 2-cyclopentylamino- 1-propanol base which melts at 105–6° C. and shows an optical rotation of $[\alpha]_D^{22}$ +19.3° when dissolved in 3% solution in ethanol.

By dissolving 17 grams or 0.07 mole of dextro-rotatory 1-paramethoxyphenyl - 2-cyclopentylamino - 1 - propanol base in warm ethanol and neutralizing with dilute hydrochloric acid, then evaporating and finally crystallizing the residue from an ethanol solution by addition of acetone there is obtained levo-rotatory 1-paramethoxyphenyl-2-cyclopentylamino-1-propanol hydrochloride in prisms melting on heating at 203–4° C. When dissolved in 5% solution in water it shows an optical rotation of $[\alpha]_D^{24}$ —11.2°. This levo-rotatory hydrochloride product is suitable for producing adequate physiological effects and is nearly twice as active in medical preparations as the optically inactive 1-paramethoxyphenyl-2-cyclopentylamino-1-propanol hydrochloride described in an earlier paragraph.

By proceeding similarly with the levo-rotatory 1-paramethoxyphenyl- 2-cyclopentylamino- 1-propanol base to the corresponding hydrochloride there is obtained dextro-rotatory 1-paramethoxyphenyl-2-cyclopentylamino-1-propanol hydrochloride in prisms melting at 203–4° C. which when dissolved in 5% aqueous solution shows an optical rotation of $[\alpha]_D^{26}$ +11.2°.

In medical preparation for use as a circulatory stimulant or for other therapeutic purpose in the nature and proportion of other ingredients that may be conjugated or compounded with the optically inactive or optically active forms of 1-paramethoxyphenyl- 2-cyclopentylamino-1-propanol bases or their salts are subject to variation depending upon the medical effect to be obtained and the method by which the compound is to be administered. For oral administration capsules or tablets having from 5 to 50 milligrams of a pure salt alone or together with other substances may be prepared. These other substances may include other medically active compounds exerting effects separately or in conjunction with the 1-paramethoxyphenyl-2-cyclopentylamino-1-propanol compound. Elixir solutions containing concentrations of from 1:200 to 1:100 of a pure base or salt in an otherwise medicated or non-medicated sweet base solution may be prepared. Solutions for hypodermic or intravenius medication containing concentrations of from 1:500 to 1:50 of a pure 1-paramethoxyphenyl-2-cyclopentylamino-1-propanol salt in aqueous physiological solution may be prepared.

I claim:

1. A 1 - paramethoxyphenyl-2-cyclopentylamino-1-propanol compound of the structural formula

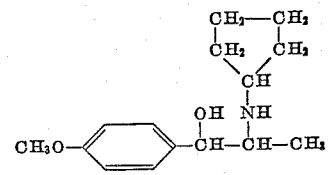

of the group consisting of optically inactive and optically active forms of 1-paramethoxyphenyl- 2-cyclopentylamino-1-propanol base and salts thereof.

2. Optically inactive 1-paramethoxyphenyl-2-cyclopentylamino-1-propanol base.

3. A salt of optically inactive 1-paramethoxyphenyl-2-cyclopentylamino-1-propanol base.

4. The hydrochloride of optically inactive 1-paramethoxyphenyl-2-cyclopentylamino-1-propanol base.

5. Dextro-rotatory 1-paramethoxyphenyl-2-cyclopentylamino-1-propanol base.

6. A salt of dextro-rotatory 1-paramethoxyphenyl-2-cyclopentylamino-1-propanol base.

7. The levo-rotatory hydrochloride of dextro-rotatory 1-paramethoxyphenyl - 2 - cyclopentylamino-1-propanol base.

References Cited in the file of this patent

Read et al.: Chem. Abst. (1928), vol. 22, p. 3397.
Koller: "Chem. Abst." (1927), vol. 21, pp. 1255–6.
Engelhardt et al.: JACS (June 1950), vol. 72, pp. 2718–22.